US012759842B2

(12) United States Patent
Herkel

(10) Patent No.: US 12,759,842 B2
(45) Date of Patent: Oct. 13, 2026

(54) VERIFYING CONFIGURATION PARAMETER CHANGES IN AN ELEVATOR SAFETY SYSTEM

(71) Applicant: Otis Elevator Company, Farmington, CT (US)

(72) Inventor: Peter Herkel, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 648 days.

(21) Appl. No.: 18/448,251

(22) Filed: Aug. 11, 2023

(65) Prior Publication Data

US 2024/0208775 A1 Jun. 27, 2024

(30) Foreign Application Priority Data

Dec. 22, 2022 (EP) .................................... 22216187

(51) Int. Cl.

| | |
|---|---|
| ***B66B 5/00*** | (2006.01) |
| ***B66B 1/32*** | (2006.01) |
| ***B66B 1/34*** | (2006.01) |
| ***B66B 1/44*** | (2006.01) |
| ***B66B 5/02*** | (2006.01) |
| ***B66B 5/04*** | (2006.01) |
| ***B66B 13/22*** | (2006.01) |

(52) U.S. Cl.

CPC .............. *B66B 5/0031* (2013.01); *B66B 1/32* (2013.01); *B66B 1/3407* (2013.01); *B66B 1/3461* (2013.01); *B66B 1/44* (2013.01); *B66B 5/02* (2013.01); *B66B 5/024* (2013.01); *B66B 5/048* (2013.01); *B66B 13/22* (2013.01)

(58) Field of Classification Search

CPC ....... B66B 5/0087; B66B 1/32; B66B 1/3461; B66B 1/44; B66B 5/0018; B66B 5/02; B66B 5/024

See application file for complete search history.

(56) References Cited

U.S. PATENT DOCUMENTS

| | | | | |
|---|---|---|---|---|
| 8,807,285 | B2 | 8/2014 | Kugiya et al. | |
| 10,640,330 | B2 | 5/2020 | Krämer | |
| 2016/0257528 | A1 | 9/2016 | Kirchhoff et al. | |
| 2019/0284022 | A1* | 9/2019 | Herkel .................... | B66B 5/027 |
| 2020/0031620 | A1* | 1/2020 | Herkel .................... | B66B 5/027 |

(Continued)

FOREIGN PATENT DOCUMENTS

| | | |
|---|---|---|
| CN | 100390038 C | 5/2008 |
| CN | 101152939 B | 12/2010 |

(Continued)

OTHER PUBLICATIONS

European Search Report for Application No. 22216187.9; May 30, 2023, 8 Pages.

*Primary Examiner* — Eduardo Colon Santana
(74) *Attorney, Agent, or Firm* — CANTOR COLBURN LLP

(57) ABSTRACT

A method of verifying configuration parameter changes in an elevator safety system includes detecting (100) a change in one or more of the configuration parameters stored in the memory; putting (102) the elevator system into an out-of-service mode; carrying out (104) a functional test of the elevator safety system to verify an appropriate safety action; and then putting (108) the elevator system back into an in-service mode.

14 Claims, 2 Drawing Sheets

(56) References Cited

U.S. PATENT DOCUMENTS

Figure 1:
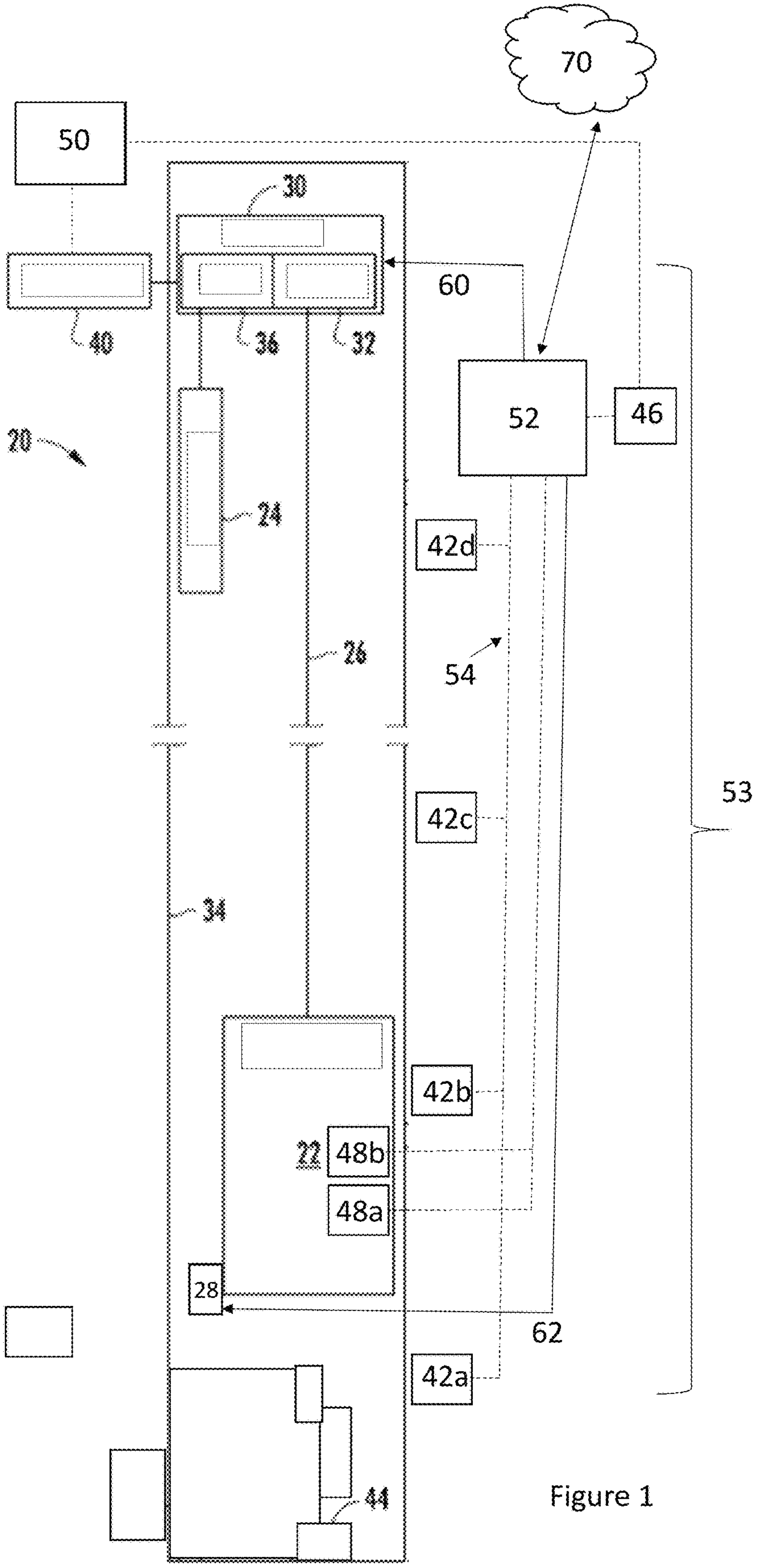

| | | | | |
|---|---|---|---|---|
| 2020/0165098 | A1* | 5/2020 | Herkel | B66B 1/36 |
| 2021/0155453 | A1* | 5/2021 | Kinnari | G01B 21/16 |
| 2021/0155454 | A1* | 5/2021 | Kinnari | B66B 1/3461 |
| 2021/0155455 | A1 | 5/2021 | Herkel et al. | |
| 2021/0331892 | A1* | 10/2021 | Kattainen | B66B 5/0031 |
| 2022/0380173 | A1* | 12/2022 | Tegtmeier | B66B 5/0006 |
| 2023/0146745 | A1* | 5/2023 | Herkel | B66B 5/04 187/316 |
| 2024/0208775 | A1* | 6/2024 | Herkel | B66B 1/44 |
| 2024/0253946 | A1* | 8/2024 | Julian-Hall | B66B 5/0025 |

FOREIGN PATENT DOCUMENTS

| | | | | |
|---|---|---|---|---|
| CN | 101353125 | B | 1/2011 | |
| CN | 104555641 | B | 9/2017 | |
| CN | 105793182 | B | 4/2018 | |
| CN | 111788138 | B | 11/2021 | |
| EP | 1638880 | B1 | 7/2007 | |
| EP | 1719729 | B1 | 4/2011 | |
| EP | 1866231 | B1 | 4/2013 | |
| EP | 1921038 | B1 | 2/2014 | |
| EP | 2349899 | B1 | 4/2014 | |
| EP | 2741989 | B1 | 3/2015 | |
| EP | 2789563 | B1 | 11/2015 | |
| EP | 1852382 | B1 | 12/2015 | |
| EP | 2637956 | B1 | 4/2016 | |
| EP | 2336070 | B1 | 8/2016 | |
| EP | 2900581 | B1 | 9/2016 | |
| EP | 2360112 | B1 | 4/2017 | |
| EP | 2864231 | B1 | 5/2017 | |
| EP | 3061212 | B1 | 7/2018 | |
| EP | 1864935 | B1 | 11/2018 | |
| EP | 3230192 | B1 | 12/2018 | |
| EP | 3233694 | B1 | 1/2019 | |
| EP | 3233696 | B1 | 2/2019 | |
| EP | 3233697 | B1 | 2/2019 | |
| EP | 3233698 | B1 | 2/2019 | |
| EP | 3546411 | A1 * | 10/2019 | B66B 5/0025 |
| EP | 2623452 | B1 | 11/2019 | |
| EP | 3356273 | B1 | 12/2019 | |
| EP | 3233699 | B1 | 5/2020 | |
| EP | 3653556 | A1 | 5/2020 | |
| EP | 3230189 | B1 | 6/2020 | |
| EP | 3271278 | B1 | 10/2020 | |
| EP | 3403971 | B1 | 10/2020 | |
| EP | 3519338 | B1 | 3/2021 | |
| EP | 3519341 | B1 | 5/2021 | |
| EP | 3825706 | A1 | 5/2021 | |
| EP | 3548411 | B1 | 6/2021 | |
| EP | 3599208 | B1 | 6/2021 | |
| EP | 3209589 | B1 | 4/2022 | |
| EP | 3083478 | B1 | 6/2022 | |
| WO | 2020249475 | A1 | 12/2020 | |
| WO | 2021105192 | A1 | 6/2021 | |

* cited by examiner

VERIFYING CONFIGURATION PARAMETER CHANGES IN AN ELEVATOR SAFETY SYSTEM

FOREIGN PRIORITY

This application claims priority to European Patent Application No. 22216187.9, filed Dec. 22, 2022, and all the benefits accruing therefrom under 35 U.S.C. § 119, the contents of which in its entirety are herein incorporated by reference.

TECHNICAL FIELD

This disclosure relates to a method of verifying configuration parameter changes in an elevator safety system and an elevator system implementing such a method.

BACKGROUND

It is known to provide an elevator safety system comprising safety nodes that monitor separate components of the elevator system, e.g. door sensors detecting whether a door lock has engaged.

If electronic changes are made to the elevator safety system, e.g. by downloading a new software or exchanging some of the stored configuration parameters, it is possible that proper functioning of the safety system may be affected.

SUMMARY

According to a first aspect of this disclosure there is provided a method of verifying configuration parameter changes in an elevator safety system, the elevator safety system comprising: one or more safety nodes, each arranged to monitor an input received from an associated safety sensor in an elevator system; a memory storing configuration parameters and a processor with access to the memory; the processor being arranged to access a stored configuration parameter of relevance to an input received at a safety node and to evaluate the input with reference to the configuration parameter; and the processor being arranged to output an actuation signal for one or more safety actions based on the evaluation of the input; the method comprising: putting the elevator system into an out-of-service mode in response to detecting a change in one or more of the configuration parameters stored in the memory; in the out-of-service mode, carrying out a functional test of the elevator safety system by moving an empty elevator car under predetermined conditions and verifying that the processor outputs an actuation signal for an appropriate safety action under these predetermined conditions; and then putting the elevator system back into an in-service mode.

Such a method therefore puts the elevator system into an out-of-service mode upon detecting a change in configuration parameters and carries out one or more functional tests of the elevator safety system before putting the elevator system back into an in-service mode. This means that correct operation of the elevator safety system is verified after any change in configuration parameters. Normal in-service operation of the elevator system is suspended until the functional test(s) have been executed and the safety actions have been checked.

As is described further below, the configuration parameters stored in the memory may be actively changed, e.g. manually, or may become changed as a result of a change in software. The processor may be configured to detect a change in one or more of the configuration parameters stored in the memory by periodically checking the values of the stored configuration parameters. In some examples, the processor is configured to detect a change in one or more of the configuration parameters stored in the memory by receiving a prompt associated with a software change. For example, the processor may receive a prompt such as a checksum, cyclic redundancy check (CRC), hash or cryptographic signature.

Before putting the elevator system back into an in-service mode, the method may further comprise allowing one or more manual operations, such as a manual inspection or manual test. Any manual operation that does not require a load in the elevator car(s) of the elevator system may be carried out while the elevator system is in the out-of-service mode.

In some examples, the method comprises manually carrying out the one or more functional tests of the elevator safety system. The one or more functional tests may be carried out by a maintenance person, for example a maintenance person at the site of the elevator system.

In some examples, the method comprises automatically carrying out the one or more functional tests of the elevator safety system, e.g. by the elevator safety system acting autonomously. For example, the elevator safety system may comprise a safety controller that is configured to automatically initiate the one or more functional tests following a change to one or more of the configuration parameters stored in the memory. The safety controller may be involved in causing the change to configuration parameters or the safety controller may detect the change to configuration parameters. Without such automatic testing and verification, the method would rely on a maintenance person being present to ensure relevant functional tests are complete after any changes to configuration parameters. Given that the configuration parameters may be changed under a remote instruction, for example due to a software update received from the cloud, it can be more efficient for the method to proceed automatically without requiring any manual intervention before the elevator system is put back in-service.

In various examples, the step of verifying that the processor outputs an actuation signal for an appropriate safety action can be carried out automatically by the elevator safety system, for example by the safety controller. This means that the method does not have to rely on a maintenance person being present locally or available via a connection to a remote device.

It may be verified locally that the processor outputs an actuation signal for an appropriate safety action under these predetermined conditions, for example by manual inspection. However, in some examples, the method comprises remotely verifying that the processor outputs an actuation signal for an appropriate safety action under these predetermined conditions. For example, the elevator system may be monitored by a remote computing device (such as a building management server) having a communications link with the elevator system. In some examples, the elevator safety system comprises a communicative connection with a remote computing device. What is meant by a remote computing device is one outside the elevator system, and typically outside the building where the elevator system is located. For example, the remote computing device may be a cloud-based server (such as a building management server).

In various examples the method may involve a remote computing device, as mentioned above. A human operator may have control of the remote computing device. In at least some examples, the method comprises sending an instruction from a remote computing device to the elevator safety system to put the elevator system back into an in-service mode. In such examples it may be remotely verified that all necessary functional tests have been passed before the elevator system is put back into an in-service mode.

In various examples, the step of verifying that the processor outputs an actuation signal for an appropriate safety action comprises human verification. For example, the method may comprise a human verification of test results following a given functional test (e.g. checking the emergency terminal slowdown criteria when the functional test relates to emergency terminal slowdown). This human verification may occur locally (e.g. by a maintenance person at the site of the elevator system) or remotely (e.g. by an authorised person in communication with the elevator system). As mentioned above, the elevator safety system may comprise a communicative connection with a remote computing device where an operator carries out the human verification.

It will be understood that an out-of-service mode is one in which no passengers are being serviced, for example due to maintenance or update requirements. In the out-of-service mode, the elevator system can still be operated but without any passengers being serviced by the elevator car(s) in the elevator system.

It will be understood that an in-service mode is one in which passengers are being serviced, for example a normal operation mode. In the in-service mode, the elevator system is operated with passengers being serviced by the elevator car(s) in the elevator system.

The step of carrying out a functional test of the elevator safety system can be repeated several times before putting the elevator system back into the in-service mode. For example, only upon verifying that the processor outputs an actuation signal for an appropriate safety action in each functional test does the method proceed with putting the elevator system back into an in-service mode. In some examples, the method comprises automatically putting the elevator system back into an in-service mode, upon completion of the functional test(s) of the elevator safety system and upon verifying that the processor outputs an actuation signal for an appropriate safety action for each functional test.

In some examples, the method comprises carrying out a plurality of functional tests of the elevator safety system, by moving an empty elevator car in each functional test under predetermined conditions that are particular to each functional test. Some examples of the predetermined conditions for a functional test will be further understood from the following examples.

In various examples, the configuration parameters stored in the memory may include one or more of: rated speed of an elevator car; overspeed threshold of an elevator car; size of elevator car door unlocking zone; availability of elevator car rear doors; rated buffer speed for a hoistway of the elevator system; position of limit switches in a hoistway of the elevator system; availability of a buffer switch for a hoistway of the elevator system; availability of a firefighter elevator car.

In some examples, the method comprises carrying out a functional test of the elevator safety system by moving an empty elevator car downwards and checking that the processor outputs an actuation signal for an appropriate safety action of a rope brake or a safety gear e.g. for an elevator car. This functional test may be carried out when there has been a change in the configuration parameter of rated speed of an elevator car. The appropriate safety action may be to trigger a safety gear of the elevator car when the elevator car speed is input to a safety node and evaluated with reference to the rated speed.

In some examples, the method comprises carrying out a functional test of the elevator safety system by moving an empty elevator car upwards and checking that the processor outputs an actuation signal for an appropriate safety action of a rope brake or a safety gear, e.g. for a counterweight. This functional test may be carried out when there has been a change in the configuration parameter of rated speed of an elevator car, which is equivalent to rated speed of a counterweight coupled to the elevator car. The appropriate safety action may be to trigger a safety gear of the counterweight when the counterweight speed is input to a safety node and evaluated with reference to the rated speed.

In some examples, the method comprises carrying out a functional test of the elevator safety system by moving an empty elevator car upwards and checking that the processor outputs an actuation signal for an appropriate safety action of slowing down the elevator car when it approaches an upper terminal in a hoistway of the elevator system. Such an actuation signal may be output to an elevator controller and/or motor brake for the elevator car. This functional test may be carried out when there has been a change in the configuration parameter of rated buffer speed for a hoistway of the elevator system. The appropriate safety action of slowing down the elevator car may be triggered when the elevator car speed and/or position in a hoistway of the elevator system is input to a safety node and evaluated with reference to the rated buffer speed. This functional test may be carried out to verify the detection criteria for emergency terminal slowdown.

In some examples, the method comprises carrying out a functional test of the elevator safety system by moving an empty elevator car upwards/downwards and checking that the processor outputs an actuation signal for an appropriate safety action of stopping the elevator car when it passes a final limit in a hoistway of the elevator system. Such an actuation signal may be output to an elevator controller and/or to a motor brake and/or to a safety gear for the elevator car or counterweight and/or to a rope brake. This functional test may be carried out when there has been a change in the configuration parameter relating to the position of limit switches in the hoistway.

In some examples, the method comprises carrying out a functional test of the elevator safety system by moving an empty elevator car upwards and checking that the processor outputs an actuation signal for an appropriate safety action relating to overspeed detection for an elevator car. This functional test may be carried out when there has been a change in the configuration parameter of rated speed of an elevator car. The appropriate safety action may be triggered when the elevator car speed is input to a safety node and evaluated with reference to an overspeed threshold determined by the rated speed. For example, the appropriate safety action may be to apply the motor brake and/or slow down the drive motor. In some examples, the overspeed threshold of an elevator car may be stored as a standalone configuration parameter.

In some examples, the method comprises carrying out a functional test of the elevator safety system by moving an empty elevator car upwards/downwards from a landing and checking that the processor outputs an actuation signal for an appropriate safety action of preventing unintended car movement at a landing. This functional test may be carried out when there has been a change in the configuration parameter of the size of an elevator car door unlocking zone.

The appropriate safety action of preventing unintended car movement at a landing may be triggered when the elevator car position is input to a safety node and evaluated with reference to the size of an elevator car door unlocking zone. For example, the appropriate safety action may be to apply the motor brake or to trigger a safety gear or rope brake.

In some examples, the method comprises carrying out a functional test of the elevator safety system by moving an empty elevator car upwards/downwards and checking that the processor outputs an actuation signal for an appropriate safety action of designating an elevator car as a firefighter elevator car. Such an actuation signal may be output to an elevator controller. This functional test may be carried out when there has been a change in the configuration parameter relating to availability of a firefighter elevator car.

In some examples, the method comprises carrying out a functional test of the elevator safety system by moving an empty elevator car upwards/downwards and checking that the processor outputs an actuation signal for an appropriate safety action of locking or unlocking elevator car rear doors. Such an actuation signal may be output to a door controller of the elevator car. This functional test may be carried out when there has been a change in the configuration parameter relating to availability of elevator car rear doors.

In some examples, the method comprises carrying out a functional test of the elevator safety system by moving an empty elevator car upwards/downwards and checking that the processor outputs an actuation signal for an appropriate safety action of connecting to a buffer switch for a hoistway of the elevator system. Such an actuation signal may be output to an elevator controller. This functional test may be carried out when there has been a change in the configuration parameter relating to availability of a buffer switch for a hoistway of the elevator system.

It will be appreciated that the functional tests disclosed herein are not as extensive as the so-called "handover" tests that are routinely performed when an elevator system is just installed and before it is first handed over to a customer. The purpose of the disclosed functional tests is to check those safety actions which may be affected by the change of configuration parameters. However, there may be many other safety actions which will continue to be actuated reliably despite any change of configuration parameters, for example because they rely on mechanical or eletromechanical actuation. For instance, the operation of a mechanical overspeed governor in the elevator system will not be affected as its mechanical response is not affected by configuration changes. The method may therefore comprise selecting a sub-set of functional tests of relevance to the configuration parameters that are changed.

The methods disclosed herein relate to an elevator safety system comprising at least one processor arranged to access a stored configuration parameter from at least one memory. In some examples, the elevator safety system may comprise a processor receiving inputs from a single safety node or more than one safety node. In various examples, the elevator safety system comprises a plurality of safety nodes. In some examples, the plurality of safety nodes is connected to a safety controller (e.g. by a data bus) and the safety controller comprises a processor and a memory storing multiple configuration parameters of relevance to the multiple inputs received at the multiple safety nodes. The configuration parameters may be changed by updating or replacing the software running on the processor and/or by replacing the stored configuration parameters in the memory by any other means.

In such examples, the processor may be configured to detect a change in one or more of the multiple configuration parameters by performing a self-check. As mentioned above, this may be programmed as a periodic self-check or performing the self-check may be prompted e.g. upon receiving a prompt associated with a software change.

As mentioned above, the elevator safety system typically comprises a plurality of safety nodes. In some examples, each of the plurality of safety nodes comprises a processor and a memory storing at least one configuration parameter (e.g. a particular configuration parameter) of relevance to an input received at the safety node. In such examples, each safety node may comprise its own local processor that is arranged to output an actuation signal for one or more safety actions based on the evaluation of the input at the safety node. The configuration parameter(s) of relevance to the input received at the safety node may be changed by updating or replacing the software running on the local processor and/or by replacing the stored configuration parameter(s) in the memory by any other means.

In such examples, each local processor at each safety node may be configured to detect a change in its configuration parameters by performing a self-check. As mentioned above, this may be programmed as a periodic self-check or performing the self-check may be prompted e.g. upon the local processor receiving a prompt associated with a software change. In some examples, at least some of the local processors may perform a mutual check between safety nodes in order to detect a change in one or more configuration parameters. For instance, a software update at one of the safety nodes may prompt other (or even all) safety nodes in the elevator safety system to detect a change and put the elevator system into the out-of-service mode.

The detected change in one or more of the configuration parameters stored in the memory may result from a change carried out in any suitable way. In some examples, the method comprises detecting a manual change in one or more of the configuration parameters stored in the memory, for example a change made under the instruction of an on-site maintenance person. In some examples, the method comprises detecting an automatic change in one or more of the configuration parameters stored in the memory, e.g. a change made under an instruction received from a remote computing device (such as a building management server). In some examples, the method comprises detecting a change in one or more of the configuration parameters stored in the memory as a result of software running at the processor having been updated or replaced. The software update may have been initiated manually or downloaded automatically from a remote server. As mentioned above, the processor can be configured to detect a change in one or more of the configuration parameters stored in the memory by receiving a prompt associated with a software change or update. For example, the processor may receive a prompt such as a checksum, cyclic redundancy check (CRC), hash or cryptographic signature.

In various examples, each of the one or more safety nodes is arranged to monitor an input received from an associated safety sensor which may relate to an operational parameter of the elevator system. The input may relate to an operational parameter such as the speed of the elevator car, position of the elevator car, status of a limit switch in the hoistway, status of a buffer switch, status of an emergency stop switch, status of a door sensor, etc. The safety sensors may therefore include, for example, an absolute position determination system, a limit switch arranged in the hoistway (e.g. in the pit), a door sensor (for the landing doors and/or elevator car doors), a buffer switch, or a stop switch (e.g. emergency stop switch).

Upon evaluating the input received at a safety node with reference to the configuration parameter, the processor is arranged to output an actuation signal for one or more safety actions. The actuation signal may be output to an elevator controller or directly to a component in the elevator system, such as a safety gear mounted to the elevator car or to an associated counterweight. In some examples, the method comprises outputting an actuation signal to a drive system (e.g. drive motor and/or motor brake) when the safety action is slowing movement of the elevator car. In some examples, the method comprises outputting an actuation signal to a safety gear or rope brake when the safety action is an emergency stop of the elevator car.

The steps of putting the elevator system into an out-of-service mode and/or putting the elevator system back into an in-service mode may be carried out locally (e.g. by a maintenance person at the site of the elevator system) or remotely (e.g. by an off-site person in communication with the elevator system). The elevator safety system may be connected to an elevator controller which is configured to control the mode of operation of the elevator system.

According to a second aspect of this disclosure there is provided an elevator system comprising: an elevator car moving along a hoistway; an elevator controller, configured to control operation of the elevator car; and an elevator safety system comprising: one or more safety nodes, each arranged to monitor an input received from an associated safety sensor in the elevator system; a memory storing configuration parameters and a processor with access to the memory; the processor being arranged to access a stored configuration parameter of relevance to an input received at a safety node and to evaluate the input with reference to the configuration parameter; and the processor being arranged to output an actuation signal for one or more safety actions based on the evaluation of the input; wherein, during a process of verifying configuration parameter changes in the elevator safety system: the elevator controller is configured to put the elevator system into an out-of-service mode in response to detecting a change in one or more of the configuration parameters stored in the memory; in the out-of-service mode, the elevator controller is configured to carry out a functional test of the elevator safety system by moving an empty elevator car under predetermined conditions and verifying that the processor outputs an actuation signal for an appropriate safety action under these predetermined conditions; and the elevator controller or the elevator safety system is then configured to put the elevator system back into an in-service mode.

As will be understood from the discussion above, the processor may be configured to detect changes in one or more of the configuration parameters stored in the memory resulting from a manual instruction, for example an instruction received from an on-site maintenance person. In some examples, the processor may be configured to detect a change in one or more of the configuration parameters stored in the memory resulting from an automatic instruction, e.g. an instruction received from a remote computing device (such as a building management server). In some examples, the processor may be configured to detect a change in one or more of the configuration parameters stored in the memory resulting from a software update or replacement, which may be initiated manually or downloaded automatically from a remote server.

In at least some examples, the elevator safety system is arranged to verify that the processor outputs an actuation signal for an appropriate safety action. This means that verification can take place automatically.

In at least some examples, the elevator safety system comprises a communicative connection with a remote computing device and the remote computing device is arranged to verify that the processor outputs an actuation signal for an appropriate safety action. In at least some examples, the remote computing device is arranged to send an instruction to the elevator safety system to put the elevator system back into an in-service mode.

In at least some examples, the elevator controller is connected to a drive system in order to control operation of the elevator car. The drive system may include a drive motor and a motor brake. The elevator controller may be configured to control operation of the drive motor (to move the car) and of the motor brake (to stop the car), e.g. during the in-service mode of the elevator system. In some examples, the processor is configured to output an actuation signal to the drive system to effect one or more safety actions, e.g. to interrupt a power supply to the drive system so that the drive motor is prevented from operating and the motor brake is automatically applied.

In some examples, the processor is configured to output an actuation signal to a safety gear of the elevator car (or of an associated counterweight) to effect one or more safety actions, e.g. to stop the elevator car from moving.

In at least some examples, the elevator safety system comprises a plurality of safety nodes which are connected to one another, for example by a data bus e.g. a Controller Area Network (CAN) bus. In some examples, the plurality of safety nodes is connected to a safety controller (e.g. by a data bus) and the safety controller comprises a processor and a memory storing multiple configuration parameters of relevance to the multiple inputs received at the multiple safety nodes. In some examples, at least one of the safety nodes (e.g. a 'master') may include the processor, which may run software for evaluating the inputs with reference to the configuration parameters. The processor may poll the other safety nodes, e.g. at regular intervals, to obtain their inputs. In some examples, each safety node may comprise its own local processor that is arranged to output an actuation signal for one or more safety actions based on the evaluation of the input at its safety node. The configuration parameter(s) of relevance to the input received at the safety node(s) may be changed by updating the software running on the processor and/or by replacing the stored configuration parameter(s) in the memory.

In any of the examples described herein, the safety sensor associated with a safety node may comprise a sensor (such as a door sensor for the landing doors and/or elevator car doors), a physical set of contacts or a switch, for example a limit switch arranged in the hoistway (e.g. a pit limit switch), or a stop switch. In some examples the safety sensor is a speed sensor for the elevator car. In some examples the safety sensor is a drive motor current sensor. For example, the safety node may comprise a processor which monitors, as an input, the speed of the elevator car or the current draw of a drive motor which operates to drive the elevator car. The processor is arranged to output an actuation signal for a safety action (such as slowing the drive motor) upon detecting that the elevator car is moving too fast, or when the drive motor is drawing too much current.

In some examples, additionally or alternatively, the elevator system further comprises a position determination system connected to the elevator controller and/or to at least one safety node. The position determination system may be any position reference system that is capable of outputting a position of the elevator car within the hoistway. For example, the position determination system may comprise an encoder associated with the drive system, which is capable of outputting a position of the elevator car within the hoistway based on measurements related to the movement of the drive motor. In a set of examples, the position determination system is an absolute position determination system, i.e. which accurately determines the absolute position of the elevator car relative to a hoistway in which the elevator car travels. The position determination system advantageously collects (e.g. absolute) position information about the elevator car which is then input to the safety node. In some examples, the position determination system collects (e.g. absolute) position information about the elevator car and calculates the speed of the elevator car, which is then input to the safety node.

DRAWING DESCRIPTION

Figure 2:
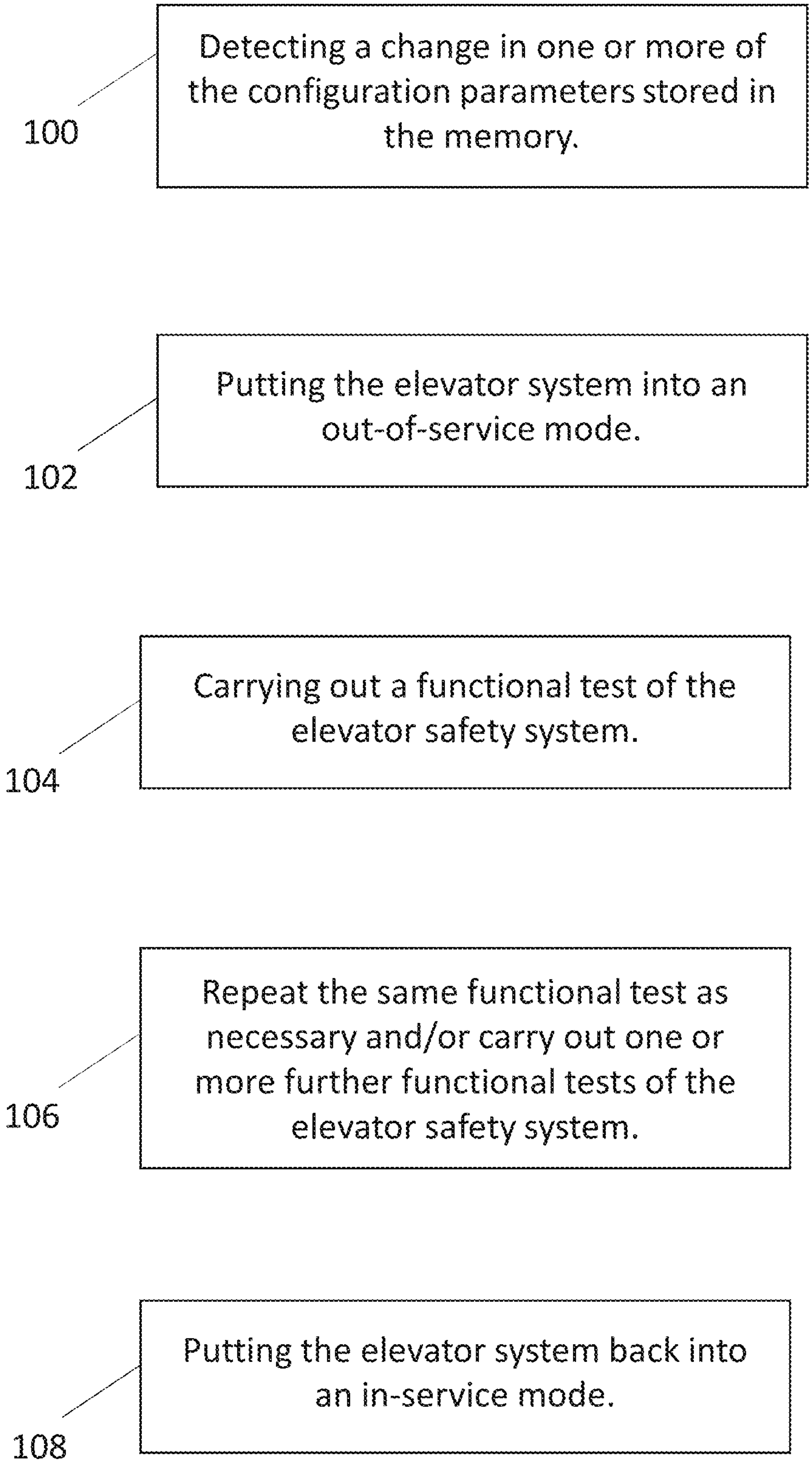

An illustrative example of this disclosure will now be described with reference to the accompanying drawings, in which:

FIG. 1 is a schematic view of an elevator system according to an example of the present disclosure; and FIG. 2 is a flow diagram for an exemplary method of verifying configuration parameter changes in an elevator safety system.

DETAILED DESCRIPTION

As shown in FIG. 1, an elevator system 20 comprises an elevator car 22 that moves in a hoistway 34 between various floors of a building. The elevator car 22 is suspended in the hoistway 34 by a tension member 26 (e.g. one or more ropes or belts). The other end of the tension member 26 is connected to a counterweight 24. However, it will be appreciated that in other examples the elevator system may be ropeless.

During an in-service mode, the elevator car 22 travels up and down in the hoistway 34 to transport passengers and/or cargo between floors of the building. The elevator car 22 is driven by a drive system 30 comprising a drive motor 32 and a motor brake 36. The tension member 26 passes over a drive sheave (not shown) that is driven to rotate by the drive motor 32 and slowed by the motor brake 36. Normal operation of the drive system 30 is controlled by an elevator controller 40. The elevator car 22 has a safety gear 28 that can be triggered to bring the elevator car 22 to an immediate standstill. Although not shown, the counterweight 24 may also include such a safety gear.

The elevator system 20 also comprises an absolute position determination system 50 configured to determine the absolute position and velocity of the elevator car 22 in the hoistway 34. In this example, the absolute position determination system 50 is configured to output a measurement of the absolute position and velocity of the elevator car 22 to the elevator controller 40. The absolute position determination system 50 can include a coded tape (not shown) extending at least part of the way along the hoistway 34 and at least one sensor (not shown) mounted on the elevator car 22 and arranged to read the coded tape to determine the absolute position and velocity of the elevator car 22 as it moves along the hoistway 34.

The elevator system 20 also comprises an elevator safety system 53, including a safety controller 52 connected to a data bus 54. The safety controller 52 may be a node as defined in the relevant Programmable Electronic System in Safety Related Applications for Lifts (PESSRAL) standard(s). The safety controller 52 communicates over the data bus 54 with a plurality of safety nodes 42*a-d*, 44, 46, 48*a-b*. The data bus 54 may be a CAN bus, and is represented in FIG. 1 with a dashed line.

The safety controller 52 of the elevator safety system 53 has a communicative connection with a remote computing device 70. It can be seen that the remote computing device 70 is outside the elevator system 20, and typically outside the building where the elevator system 20 is located. For example, the remote computing device 70 may be a cloud-based server (such as a building management server). The remote computing device 70 can be used to remotely verify functional tests that are carried out during an out-of-service mode. The remote computing device 70 can also send an instruction to the elevator safety system 53 when it is deemed appropriate to put the elevator system 20 back into an in-service mode.

The safety nodes 42*a-d*, 44, 46, 48*a-b* are each associated with a safety sensor located in the elevator system 20. In the particular example as shown, there are four safety nodes 42*a-d* for the landing doors, each corresponding to a safety sensor for the respective set of landing doors of the elevator system 20. There is a safety node 44 for the pit limit switch. There is a safety node 46 associated with a safety sensor for overspeed detection. The overspeed detection safety node 46 is connected to the absolute position determination system 50. There are also shown two safety nodes, 48*a*, 48*b*, associated with safety sensors of the elevator car 22. For example, there is an elevator car door safety node 48*a* and a safety node 48*b* for an emergency stop switch in the elevator car 22.

In this illustrated example, the safety controller 52 includes a memory storing configuration parameters and a processor with access to the memory. The processor is arranged to access a stored configuration parameter of relevance to an input received at a particular safety node 42*a-d*, 44, 46, 48*a-b* and to evaluate the input with reference to the configuration parameter. The safety controller 52 can then output an actuation signal 60, 62 for one or more safety actions based on the evaluation of the input The safety controller 52 can output an actuation signal 60 to interrupt the supply of power to the drive system 30 to execute the safety action of an emergency stop. This actuation signal 60 can act independently of the elevator controller 40 being configured to control the drive system 30. The safety controller 52 simply allows or prevents movement of the elevator car 22, but cannot be used to move the elevator car 22 to a floor. It is the elevator controller 40 which issues a run command to the drive system 30, whether during normal operation in the in-service mode or when carrying out a functional test during the out-of-service mode.

In another example of a safety action, the safety controller 52 (e.g. acting as an electronic speed governor) can output an actuation signal 62 to trigger the safety gear 28 of the elevator car 22 when the elevator car speed is input to the overspeed detection safety node 46 and evaluated with reference to the rated speed.

In the in-service mode, an emergency stop of the elevator car 22 may be triggered based on an input received at any of the various safety nodes connected to the safety bus 54. For instance, if a landing door is opened (as detected by one of the safety nodes 42*a-d*), if a maintenance worker operates an emergency stop switch (as detected by safety node 48*b*), or the elevator car 22 travels too quickly (as detected by overspeed detection node 46), the safety action of an emergency stop may be actuated by the safety controller 52, for example by the actuation signal 60 interrupting the supply of power to the drive system 30. The loss of power triggers the motor brake 36 to engage and stops the motor 32 (i.e. removes any drive torque applied to the drive sheave). This brings the elevator car 22 (and the counterweight 24) quickly to a halt. However, this relies on the safety controller 52 correctly evaluating the input with reference to the stored configuration parameters, which may change during a software update or other configuration change.

During a process of verifying configuration parameter changes in the elevator safety system 53, the elevator controller 40 is configured to put the elevator system 20 into an out-of-service mode upon detecting any changes to the configuration parameters stored in the memory of the safety controller 52. Then the elevator controller 40 is configured to carry out a functional test of the elevator safety system 53 by moving the empty elevator car 22 under predetermined conditions and verifying that the safety controller 52 outputs an actuation signal 60, 62 for an appropriate safety action under these predetermined conditions. After completing the functional test(s), the elevator controller 40 or the elevator safety system 53 is then configured to put the elevator system 20 back into an in-service mode. This may be initiated automatically or upon receiving an instruction from the remote computing device 70.

There is illustrated in FIG. 2 an exemplary method of verifying configuration parameter changes in an elevator safety system, which may have the architecture seen in FIG. 1 or any other suitable architecture. The steps 100-108 take place sequentially in the following temporal order. A first step 100 comprises detecting a change in one or more of the configuration parameters stored in the memory. A second step 102 comprises putting the elevator system into an out-of-service mode. A third step 104 comprises carrying out a functional test of the elevator safety system to verify an appropriate safety action. Verification may take place automatically (e.g. by the elevator safety system 53 itself) or remotely (e.g. by the remote computing device 70). The functional test may involve moving an empty elevator car under predetermined conditions and verifying that the processor outputs an actuation signal for an appropriate safety action under these predetermined conditions. An optional fourth step 106 is to repeat the same functional test as necessary and/or carry out one or more further functional tests of the elevator safety system. Only once there is a positive verification outcome from step 104 (and step 106 where this applies) does the process continue to the final step 108 which comprises putting the elevator system back into an in-service mode.

It will be appreciated by those skilled in the art that the disclosure has been illustrated by describing one or more specific examples thereof, but is not limited to these examples; many variations and modifications are possible, within the scope of the accompanying claims.

What is claimed is:

1. A method of verifying configuration parameter changes in an elevator safety system (53), the elevator safety system (53) comprising:

one or more safety nodes (42*a-d*, 44, 46, 48*a-b*), each arranged to monitor an input received from an associated safety sensor in an elevator system (20); a memory storing configuration parameters and a processor (52) with access to the memory; the processor (52) being arranged to access a stored configuration parameter of relevance to an input received at a safety node (42*a-d*, 44, 46, 48*a-b*) and to evaluate the input with reference to the configuration parameter; and the processor (52) being arranged to output an actuation signal (60,62) for one or more safety actions based on the evaluation of the input;

the method comprising:

putting the elevator system (20) into an out-of-service mode in response to detecting a change in one or more of the configuration parameters stored in the memory;

in the out-of-service mode, carrying out a functional test of the elevator safety system (53) by moving an empty elevator car (22) under predetermined conditions and verifying that the processor (52) outputs an actuation signal (60,62) for an appropriate safety action under these predetermined conditions; and then putting the elevator system (20) back into an in-service mode.

2. The method of claim 1, comprising:

automatically carrying out the one or more functional tests of the elevator safety system (53) and/or automatically verifying that the processor (52) outputs an actuation signal (60,62) for an appropriate safety action.

3. The method of claim 1, comprising:

remotely verifying that the processor outputs an actuation signal for an appropriate safety action under these predetermined conditions.

4. The method of claim 1, comprising:

sending an instruction from a remote computing device (70) to the elevator safety system (53) to put the elevator system (20) back into an in-service mode.

5. The method of claim 1, comprising:

carrying out a plurality of functional tests of the elevator safety system (53), by moving an empty elevator car (22) in each functional test under predetermined conditions that are particular to each functional test.

6. The method of claim 1, comprising:

upon completion of the functional test(s) of the elevator safety system (53) and upon verifying that the processor (52) outputs an actuation signal (60,62) for an appropriate safety action for each functional test, automatically putting the elevator system (20) back into an in-service mode.

7. The method of claim 1, comprising:

carrying out a functional test of the elevator safety system (53) by moving an empty elevator car (22) downwards and checking that the processor (52) outputs an actuation signal for an appropriate safety action of a safety gear (28) or rope brake.

8. The method of claim 1, comprising one or more of:

carrying out a functional test of the elevator safety system (53) by moving an empty elevator car (22) upwards and checking that the processor (52) outputs an actuation signal for an appropriate safety action of slowing down the elevator car when it approaches an upper terminal in a hoistway of the elevator system;

carrying out a functional test of the elevator safety system (53) by moving an empty elevator car (22) upwards/downwards and checking that the processor (52) outputs an actuation signal for an appropriate safety action of stopping the elevator car when it passes a final limit in a hoistway of the elevator system;

carrying out a functional test of the elevator safety system (53) by moving an empty elevator car (22) upwards and checking that the processor (52) outputs an actuation signal for an appropriate safety action relating to overspeed detection for an elevator car;

carrying out a functional test of the elevator safety system (53) by moving an empty elevator car (22) upwards/ downwards from a landing and checking that the processor (52) outputs an actuation signal for an appropriate safety action of preventing unintended car movement at a landing;

carrying out a functional test of the elevator safety system (53) by moving an empty elevator car (22) upwards/downwards and checking that the processor (52) outputs an actuation signal for an appropriate safety action of designating an elevator car as a firefighter elevator car;

carrying out a functional test of the elevator safety system (53) by moving an empty elevator car (22) upwards/downwards and checking that the processor (52) outputs an actuation signal for an appropriate safety action of locking or unlocking elevator car rear doors.

9. The method of claim 1, comprising:

detecting a manual change in one or more of the configuration parameters stored in the memory.

10. The method of claim 1, comprising:

detecting an automatic change in one or more of the configuration parameters stored in the memory.

11. The method of claim 1, comprising:

detecting a change in one or more of the configuration parameters stored in the memory as a result of software running at the processor having been updated or replaced.

12. An elevator system (20) comprising:

an elevator car (22) moving along a hoistway (34);

an elevator controller (40), configured to control operation of the elevator car (22); and an elevator safety system (53) comprising:

one or more safety nodes (42*a-d*, 44, 46, 48*a-b*), each arranged to monitor an input received from an associated safety sensor in the elevator system (20); a memory storing configuration parameters and a processor (52) with access to the memory; the processor (52) being arranged to access a stored configuration parameter of relevance to an input received at a safety node (42*a-d*, 44, 46, 48*a-b*) and to evaluate the input with reference to the configuration parameter; and the processor (52) being arranged to output an actuation signal (60,62) for one or more safety actions based on the evaluation of the input;

wherein, during a process of verifying configuration parameter changes in the elevator safety system (53):

the elevator controller (40) is configured to put the elevator system (20) into an out-of-service mode in response to detecting a change in one or more of the configuration parameters stored in the memory;

in the out-of-service mode, the elevator controller (40) is configured to carry out a functional test of the elevator safety system (53) by moving an empty elevator car (22) under predetermined conditions and verifying that the processor (52) outputs an actuation signal (60,62) for an appropriate safety action under these predetermined conditions; and the elevator controller (40) or the elevator safety system (53) is then configured to put the elevator system back into an in-service mode.

13. The elevator system (20) of claim 12, wherein the elevator safety system (53) is arranged to verify that the processor (52) outputs an actuation signal (60,62) for an appropriate safety action.

14. The elevator system (20) of claim 12, wherein the elevator safety system (53) comprises a communicative connection with a remote computing device (70) and the remote computing device (70) is arranged to:

verify that the processor (52) outputs an actuation signal (60,62) for an appropriate safety action; and/or send an instruction to the elevator safety system (53) to put the elevator system back into an in-service mode.

* * * * *